United States Patent Office 3,461,114
Patented Aug. 12, 1969

3,461,114
PROCESS FOR THE PREPARATION OF VITAMIN
B$_{12}$ COENZYME AND DERIVATIVES THEREOF
Masuo Murakami, Kozo Takahashi, Jun Matsumoto, and
Hidenori Iwamoto, Tokyo, Japan, assignors to Yamanouchi Pharmaceutical Co., Ltd., Tokyo, Japan
No Drawing. Filed Sept. 29, 1967, Ser. No. 671,598
Claims priority, application Japan, Oct. 1, 1966,
41/64,637
Int. Cl. C07d 55/62; A61k 25/02
U.S. Cl. 260—211.7                           5 Claims

ABSTRACT OF THE DISCLOSURE

Vitamin B$_{12}$ coenzyme is obtained in high yield by reacting a thiol complex of more than 2 mols of thiol and 1 mol of cobalamin with a 5'-tosyladenosine (e.g. 2',3'-O-isopropylidene-5'-tosyladenosine) as alkylating agent (5'-deoxyadenosylating agent) under basic conditions.

---

The present invention relates to a process for the preparation of vitamin B$_{12}$ coenzyme and derivatives thereof.

It has been considered that when cobalamins such as cyanocobalamin, hydroxocobalamin, and nitrosocobalamin are administered, in unit dosage form, to the human body, they exhibit their activities after being converted into vitamin B$_{12}$ coenzyme in the liver. On the other hand, when vitamin B$_{12}$ coenzyme is administered to a human body, the coenzyme acts directly because the conversion thereof into vitamin B$_{12}$ coenzyme in the human body is unnecessary. Therefore, it is very profitable to administer vitamin B$_{12}$ coenzyme into the therapy of a patient whose liver function has been lowered. Furthermore, since vitamin B$_{12}$ coenzyme has an excellent retention in the body as compared with those of the above-mentioned cobalamins, there is the advantage that, when it is administered to the body, the interval between administrations thereof can be prolonged as compared with the cobalamins.

The vitamin B$_{12}$ coenzyme is a cyanocobalamin wherein a 5'-deoxyadenosyl group (alkyl group) has been bonded to the central Co atom instead of the cyano group. By the derivatives of vitamin B$_{12}$ coenzyme in this invention are meant vitamin B$_{12}$ coenzyme of which the 2'-position and/or the 3'-position of the 5'-deoxyadenosyl group is substituted with an acetyl group or an isopropylidene group as well as the compound wherein the amino group of the 5'-deoxyadenosyl group may be further substituted with an acetyl group or a formyl group.

As a process for preparing vitamin B$_{12}$ coenzyme or the derivative thereof by introducing a 5'-deoxyadenosyl group or a derivative thereof into the central Co atom of the molecule of cobalamin, there is known a process wherein a cobalamin such as cyanocobalamin or hydroxocobalamin is reduced with Zn+AcOH, NaBH$_4$, chromous acetate, or Zn+NH$_4$Cl to form the complete reduction product thereof, i.e., vitamin B$_{12}$'s (the compound has the chraacteristic absorption near the wave length of 385 m. (Nature: 176, 1265 (1955), and Chemical Review: 63, 591 (1963) and the compound is caused to react with an alkylating agent (5'-deoxyadenosylating agent) such as 5'-tosyladenosine (Bernhauer et al.; Biochem. Zeit.: 336, 102 (1962), Johnson et al.; J. Chem. Soc.: 4146 (1963) and U.S. Patent No. 3,213,082). However, such a process is not excellent as an industrial process since not only the reduction of a vitamin B$_{12}$ but also the reaction of the complete reduction product thereof with the alkylating agent must be conducted in a completely oxygen-free atmosphere.

On the other hand, as a process for preparing a lower alkyl cobalamin wherein a lower alkyl group is introduced into the central Co atom of the cobalamin molecule, there is known a process wherein hydroxocobalamin is caused to react with a mercaptan, sodium sulfide or sodium hydrogen sulfide to form a thiol complex and then the complex is caused to react with a lower alkylating agent such as CH$_3$I, or C$_2$H$_5$I (Dolphin, Johnson et al.; J. Chem. Soc.; 2174 (1965) and Dolphin et al.; Proc. Chem. Soc.: 311 (1963)).

However, at the same time, it has been known that by the latter process vitamin B$_{12}$ coenzyme or a derivative thereof cannot be obtained, that is, if the size of the alkylating agent is increased, the reaction of the alkylating agent and a thiol complex will become difficult. For instance, in the case of reacting 2',3'-O-isopropylidene-5'-tosyladenosine as an alkylating agent, an objective alkylated material (2',3'-O-isopropylidene-5'-deoxyadenosylcobalamin) is not obtained (J. Chem. Soc.: 2178 (1965), lines 1–3).

Thus, there have been known the above two methods, as processes for preparing alkylcobalamins by introducing an alkyl group (included 5'-deoxyadenosyl group or a derivative thereof) into the central Co atom of the molecule of cobalamin, but as mentioned above, in the former method the reaction system must be completely shielded from oxygen and in the latter method, although it is unnecessary to carry out the reaction in an oxygen-free atmosphere, a large alkyl group, that is, a 5'-deoxyadenosyl group or a derivative thereof cannot be introduced into the central Co atom of the cobalamin. Therefore, it has been desired to produce vitamin B$_{12}$ coenzyme by introducing 5'-deoxyadenosyl group or a derivative thereof into the cobalamin without the necessity of the troublesome procedure of shielding the reaction system from oxygen.

Therefore, an object of this invention is to provide an improved process for preparing vitamin B$_{12}$ coenzyme and the derivatives thereof without entailing the above-mentioned troubles.

Another object of this invention is to enable the introduction of 5'-deoxyadenosyl group or a derivative thereof into the central Co atom of a cobalamin in a normal atmosphere.

These objects of this invention can be achieved by the process of the present invention.

That is, the inventors have found that vitamin B$_{12}$ coenzyme or a derivative thereof can be obtained by reacting a thiol complex consisting of more than 2 mols of a specific thiol compound and 1 mol of a cobalamin with a 5'-tosyladenosine (e.g. aforesaid 2',3'-O-isopropylidene-5-tosyladenosine) as an alkylating agent (5'-deoxyadenosylating agent) under a basic condition.

The inventors have further found that when a 5'-deoxy-5'-halogenoadenosine (e.g. 2',3'-O-isopropylidene-5'-deoxy-5'-iodoadenosine) is employed as the alkylating agent (5'-deoxyadenosylating agent), it is caused to react with the thiol complex of any thiol compound to provide vitamin B$_{12}$ coenzyme or a derivative thereof with a good yield.

It has never been expected a 5'-tosyladenosine (e.g. 2',3'-O-isopropylidene-5'-tosyladenosine) that has hitherto been considered not to be caused to react with a thiol complex is caused to react with a thiol complex under a basic condition (in the aforesaid known process the introduction of a lower alkyl group into a cobalamin molecule has been conducted under an acid condition (J. Chem. Soc: page 2181, line 5–20 (1956) but the conditions in case where the introduction of a large alkyl group has been conducted are obscure) and an objective material can be obtained with a good yield when a specific thiol compound is employed for preparing the thiol complex as well as that a 5′-deoxy-5′-halogenoadenosine the molecule of which is as large as the molecule of a 5′-tosyladenosine is caused to react with a thiol complex of any thiol compound under a basic condition to provide an objective product with a good yield.

Further, in the present invention, the reaction of the thiol complex and the alkylating agent (5′-deoxyadenosylating agent) and the subsequent treatments must be conducted under light shielding as in the foregoing known process. However, it is unnecessary to conduct them under the completely oxygen-free conditions as in the process described in U.S. Patent No. 3,213,082.

As a cobalamin for forming the thiol complex in the process of this invention, besides hydroxocobalamin, there may be used cyanocobalamin, nitrosocobalamin and the like.

As the alkylating agent (5′-deoxyadenosylating agent), 5′-tosyladenosine, there are illustrated 5′-tosyladenosine, 2′,3′-O-isopropylidene-5′-tosyladenosine and the like.

Also, as a 5′-deoxy-5′-halogenoadenosine, there are illustrated 5′-deoxy-5′-iodoadenosine, 5′-deoxy-5′-bromoadenosine, 2′,3′-O-isopropylidene-5′-deoxy-5′-iodoadenosine, 2′,3′-O-isopropylidene-5′-deoxy-5′-bromoadenosine, N - acetyl - 2′,3′ - O - isopropylidene - 5′ - deoxy - 5′- iodoadenosine and the like.

As the thiol compound, there are illustrated, in the case where a 5′-tosyladenosine is used as the alkylating agent (5′-deoxyadenosylating agent), thiophenol, methanethiol, ethanethiol, propanethiol, isopropanethiol, dihydrolipoic acid, ethanedithiol, 1,3-propanedithiol, and 1,4-butanedithiol and among them the last four compounds are most preferable.

Also, in the case where the alkylating agent (5′-deoxyadenosylating agent) is a 5′-deoxy-5′-halogenoadenosine, there may be employed cysteine, N-acetylcysteine, glutathione, p-hydroxythiophenol, tertbutanethiol and the like besides the aforesaid thiols.

As a solvent used in the reaction of the present invention, there may be employed usually water, a lower alcohol such as methanol or ethanol, a solvent miscible with water, such as, acetone or dioxane, and a mixed solvent thereof with water.

In the practice of the present invention, 1 mol of hydroxocobalamin is caused to react with more than 2 mols of the thiol compound in the aforesaid solvent to form a thiol complex and then the thiol complex solution thus obtained is added with the alkylating agent (5′-deoxyadenosylating agent) under light-shielding and thereafter added with an alkaline material such as potassium hydroxide, sodium hydroxide, sodium carbonate, ammonia and the like to cause the reaction.

Furthermore, in the process of this invention, the separation of the product may be conducted from the reaction liquid, under light-shielding, by an extraction method with an organic solvent such as phenol, or by a chromatographic method.

The derivative of vitamin $B_{12}$ coenzyme obtained by the process of this invention has no activity of vitamin $B_{12}$ coenzyme but by liberating the substituent at the 2′-position and the 3′-position of the 5′-deoxyadenosyl group thereof and, in some cases, the substituent of the amino group if present, the derivative can be easily converted into vitamin $B_{12}$ coenzyme. In this case, the substituent, such as an isopropylidene group at the 2′-position and/or 3′-position of the 5′-deoxyadenosyl group or the substituent, such as an acetyl group at the amino group of the 5′-deoxyadenosyl group can be liberated by a mineral acid such as sulfuric acid or hydrochloric acid and also the substituent, such as an acetyl group at the 2′-position and/or 3′-position of the 5′-deoxyadenosyl group can be liberated by alcoholic ammonia or an alkali metal alkoxide.

The invention has been explained above only with reference to hydroxocobalamin, but it should be understood that other cobalamins such as cyanocobalamin or nitrosocobalamin can also be employed.

The invention will further be explained by the following examples.

Example 1

Into a mixed solvent of 0.5 ml. of water and 1 ml. of methanol was dissolved 50 mg. of hydroxocobalamin, into the solution thus obtained were added successively 30 mg. of N-acetyl-L-cysteine, 50 mg. 5-deoxy-5′-iodoadenosine and 30 mg. of potassium carbonate in this order, and the resulting solution was allowed to stand for 1.5 hours in the dark. The reaction solution mixture was mixed with 20 ml. of water and from the solution was extracted an available material by using a phenol-chloroform (1:1) mixture. After thoroughly washing the extract with water, chloroform was removed by distillation under a reduced pressure from the system. The residue was mixed with ether in an amount of about five times as large as that of the residue and then the available material was extracted with water. After washing the aqueous phase twice with water, it was concentrated under a reduced pressure into about 3 ml. The concentrated solution was passed through a column (1 cm. x 5 cm.) packed with an adsorbent, diethylaminoethyl cellulose to adsorb thereto the available component and thereafter the available component was eluted with water. After concentrating the elute under a reduced pressure, the concentrate was placed in an ice chamber with the addition of acetone to precipitate the red-purple crystal of 5′-deoxyadenosyl cobalamin (vitamin $B_{12}$ coenzyme). The crystal was recovered by filtration, washed with acetone and ether successively and dried. The amount of the crystal was 32 mg.

The ultraviolet and visible absorption spectra of the product has the absorption maxima at 263, 342, 378 and 530 mμ respectively.

Example 2

Into a mixed solution of 0.5 ml. of water and 2 ml. of methanol was dissolved 50 mg. of hydroxocobalamin, into the solution thus obtained were dissolved 50 mg. of thiophenol, 50 mg. of 5′-O-tosyladenosine and 20 mg. of sodium carbonate successively in this order, and the resulting solution was allowed to stand for one hour in the dark. Thereafter, by treating the system as in Example 1, 25 mg. of 5′-deoxyadenosylcobalamin was obtained.

Example 3

Into 40 ml. of deoxygenized methanol were dissolved 1 g. of hydroxocobalamin acetate, 1 g. of cysteine hydrochloride, and 0.6 g. of 5′-deoxy-5′-iodoadenosine. To the solution was added 7.5 ml. of a 1 N aqueous solution of sodium hydroxide and the resulting solution was allowed to stand for 2 hours in the dark. It was confirmed by the visible ray absorption spectra and thin-layer chromatography of the reaction liquid that the reaction proceeded quantitatively. Thereafter, the system was treated as in Example 1 and by concentrating under a reduced pressure the elute from a column packed with diethylaminoethyl cellulose and allowing the concentrate to stand for one hour with the addition of methanol, the product was very easily crystallized, which was recovered by filtration, washed with acetone and ether successively and dried to provide 825 mg. of 5′-deoxyadenosylcobalamin.

Example 4

Into 4 ml. of deoxygenized methanol were dissolved 100 mg. of hydroxocobalamin and 106 mg. of 2′,3′-O-isopropylidene-5′-deoxy-5′-bromoadenosine, to the solution thus formed was added 0.5 ml. of a 10% aqueous solution of sodium methylmercaptide, and the resulting solution was allowed to stand for 2 hours in the dark to cause the reaction. Thereafter, by treating the system as in Example 1, there was obtained 45 mg. of the red crystal of 2′,3′-O-isopropylidene-5′-deoxyadenosylcobalamin.

Example 5

Into 5 ml. of deoxygenized methanol were dissolved 100 mg. of hydroxocobalamin acetate, 2',3'-O-isopropylidene-5'-O-tosyladenosine, and 65 mg. of ethanedithiol. To the solution was added 1.3 ml. of a 1 N aqueous solution of sodium hydroxide and the resulting solution was allowed to stand in the dark to cause the reaction.

Thereafter, by treating the system as in Example 1, 75 mg. of 2',3'-O-isopropylidene-5'-deoxyadenosylcobalamin was obtained.

Example 6

Into 40 ml. of deoxygenized 50% methanol were dissolved 1 g. of hydroxocobalamin acetate, 1 g. of 5'-O-tosyladenosine, and 0.8 g. of 1,4-butanedithiol. To the solution was added 13 ml. of a 1 N aqueous solution of sodium hydroxide and the resulting solution was allowed to stand in the dark to cause the reaction.

Thereafter, by treating the system as in Example 3, 880 mg. of the red crystal of 5'-deoxyadenosylcobalamin was obtained.

Example 7

A system consisting of 100 mg. of hydroxocobalamin acetate, 100 mg. of 5'-O-tosyladenosine, 50 mg. of isopropanethiol, and 1 ml. of a 1 N aqueous solution of sodium hydroxide was reacted as in Example 6 and thereafter by treating the system as in the same procedure, 65 mg. of the red crystal of 5'-deoxyadenosylcobalamin was obtained.

Example 8

After dissolving 140 mg. of hydroxocobalamin acetate and 80 mg. of 5'-deoxy-5'-iodoadenosine into 5 ml. of 50% methanol which had been deoxygenized preliminary by introducing thereto a nitrogen gas, to the solution thus obtained was added 540 mg. of 1,3-propanedithiol and 0.5 ml. of a 1 N aqueous solution of sodium hydroxide and the resulting solution was allowed to stand for 1.5 hours.

After adding 20 ml. of water into the reaction mixed solution, the available material was extracted twice using 10 ml. each of a phenol-chloroform (1:1) mixed solvent. The two extracts were combined followed by water washing and then chloroform was removed from the system by distillation under a reduced pressure. The residual phenol solution was mixed with 30 ml. of ether and the resulting solution was extracted twice by using 10 ml. each of water. The extracts were combined and after washing with ether, the solution was concentrated under a reduced pressure into 2-3 ml.

The concentrated solution was passed through a column (12 mm. in inside diameter, 25 mm. in height) packed with diethylaminoethyl cellulose to adsorb the available material, which was then eluted with water. After concentrating the elute under a reduced pressure, the concentrate was ice-cooled with the addition of methanol, whereby the red crystal of 5'-deoxyadenosylcobalamin was precipitated. The crystal was recovered by filtration, washed with acetone and ether successively and dried to provide 139 g. of the pure product (yield 88%).

Example 9

After dissolving 140 mg. of hydroxocobalamin acetate and 80 mg. of 5'-deoxy-5'-iodoadenosine into 5 ml. methanol which had been deoxygenized by introducing sufficiently a nitrogen gas, to the solution was added 450 mg. of tert-butanethiol and 0.5 ml. of a 1 N aqueous solution of sodium hydroxide and the resulting solution was allowed to stand for 1.5 hours in the dark in a closed system. Thereafter, by treating the solution as in Example 8, 63 mg. of 5'-deoxyadenosylcobalamin (yield 40%) was obtained.

Example 10

After dissolving 140 mg. of hydroxocobalamin acetate and 80 mg. of 5'-deoxy-5'-iodoadenosine into 5 ml. of 50% methanol which had preliminarily been deoxygenized by introducing thereto nitrogen gas, to the solution thus prepared was added 310 mg. of ethanethiol and 0.5 ml. of a 1 N aqueous solution of sodium hydroxide, and the resulting solution was allowed to stand for 1.5 hours in the dark in a closed system. To the reaction mixed liquid was added 20 ml. of water and the available material was extracted twice using 10 ml. each of a phenol-chloroform (1:1) mixed solvent. After combining the extracts and washing it with ether, the resulting solution was concentrated under a reduced pressure to 2-3 ml. of the total volume.

The concentrate was passed through a column (12 mm. in inner diameter, 15 mm. in height) packed with carboxymethylcellulose and the available material adsorbed thereto was eluted with water. By concentrating the elute under a reduced pressure and ice-cooling the concentrate with the addition of methanol, the red crystal of 5'-deoxyadenosylcobalamin was precipitated. The precipitate was recovered by filtration, washed successively with acetone and ether, and dried to provide 142 mg. (yield 90%) of the product.

Example 11

After dissolving 140 mg. of hydroxocobalamine acetate and 80 mg. of 5'-deoxy-5'-iodoadenosine into 5 ml. of 50 methanol which had been deoxygenized by introducing thereto a nitrogen gas, to the solution thus formed was added 630 mg. of p-hydroxythiophenol and 0.5 ml. of a 1 N aqueous solution of sodium hydroxide, and the resulting solution was allowed to stand for one hour in the dark in a closed system. Thereafter, by treating the system as in Example 10, 134 mg. (yield 85%) of 5'-deoxyadenosylcobalamin was obtained.

Example 12

After dissolving 140 mg. of hydroxocobalamin acetate and 80 mg. of 5'-deoxy-5'-iodoadenosine into 5 ml. of 50% methanol which had been deoxygenized by introducing a nitrogen gas, to the solution thus prepared was added 1.54 g. of glutathione and 0.5 ml. of a 1 N aqueous solution of sodium hydroxide, and the resulting solution was allowed to stand for one hour in the dark in a closed system. Thereafter, by treating the system as in Example 8, 126 mg. (yield 80%) of 5'-deoxyadenosylcobalamin was obtained.

Example 13

After dissolving 140 mg. of hydroxocobalamin acetate and 80 mg. of 5'-deoxy-5'-iodoadenosine into 5 ml. of 50% methanol which had been deoxygenized by introducing thereto a nitrogen gas, to the solution thus prepared was added 1040 mg. of dihydrolipoic acid and 0.5 ml. of a 1 N aqueous solution of sodium hydroxide, and the resulting solution was allowed to stand for one hour in the dark. Thereafter, by treating the system as in Example 10, 139 mg. (yield 88%) of 5'-deoxyadenosylcobalamin was obtained.

What is claimed is:

1. A process for the preparation of a vitamin $B_{12}$ coenzyme and derivatives thereof which comprises reacting a thiol complex of a cobalamin and an organic thiol compound with a 5'-deoxyadenosylating agent under basic condition.

2. The process as claimed in claim 1 wherein said cobalamin is selected from the group consisting of hydroxocobalamin, cyanocobalamin and nitrosocobalamin.

3. The process as claimed in claim 1 wherein said 5'-deoxyadenosylating agent is selected from the group consisting of 5'-O-tosyladenosine and 2',3'-O-isopropylidene-5'-O-tosyladenosine and said thiol compound is selected from the group consisting of methanethiol, ethanethiol, propanethiol, isopropanethiol, dihydrolipolic acid, ethanedithiol, 1,3-propanedithiol, 1,4-butanedithiol and thiophenol.

4. The process as claimed in claim 1 wherein said 5'- deoxyadenosylating agent is selected from the group consisting of 5'-deoxy-5'-iodoadenosine, 5'-deoxy-5'-bromoadenosine, 2',3'-O-isopropylidene-5'-deoxy-5'-iodoadenosine, 2',3'-O-isopropylidene-5'-deoxy-5'-bromoadenosine and N-acetyl-2',3'-O-isopropylidene-5'-deoxy-5'-iodoadenosine and said thiol compound is selected from the group consisting of methanethiol, ethanethiol, propanethiol, isopropanethiol, tert-butanethiol, thiophenol, p-hydroxythiophenol, cystein, N-acetylcystein, glutathion, dihydrolipoic-acid, ethane dithiol, 1,3-propanedithiol and 1,4-butane dithiol.

5. The process as claimed in claim 1 wherein said thiol complex consists of one mol of said cobalamin and more than two mols of said thiol compound.

References Cited
UNITED STATES PATENTS
3,213,082  10/1965  Smith et al.

OTHER REFERENCES
Dolphin et al.: "Jour Chem. Soc.," 1965, pp. 2174–78.

LEWIS GOTTS, Primary Examiner

JOHNNIE R. BROWN, Assistant Examiner